United States Patent [19]

Wachter et al.

[11] 4,400,344
[45] Aug. 23, 1983

[54] STORAGE RACK FOR NUCLEAR FUEL ASSEMBLIES

[76] Inventors: William J. Wachter, R.D. 4, English Rd., Wexford, Pa. 15090; Thomas R. Robbins, 1528 Crofton Pkwy., Crofton, Md. 21114

[21] Appl. No.: 851,038

[22] Filed: Nov. 14, 1977

[51] Int. Cl.³ .............................................. G21C 19/00
[52] U.S. Cl. .................... 376/272; 376/438; 376/448; 250/506.1
[58] Field of Search .............. 176/27, 28, 30, 37, 176/76; 206/443; 250/506, 507, 518; 252/301.1 W; 376/272, 438, 448

[56] References Cited

U.S. PATENT DOCUMENTS

| | | | |
|---|---|---|---|
| 3,505,525 | 4/1970 | Sandore | 250/507 |
| 3,882,313 | 5/1975 | Siemens | 252/301.1 W |
| 3,884,839 | 5/1975 | Bon | 250/518 |
| 3,983,050 | 9/1976 | Mecham | 250/507 |
| 4,010,375 | 3/1977 | Wachter | 250/518 |
| 4,063,999 | 12/1977 | Wade | 176/37 |
| 4,096,392 | 6/1978 | Rubinstein | 250/507 |
| 4,124,445 | 11/1978 | Mollon | 252/301.1 W |

*Primary Examiner*—Donald P. Walsh
*Attorney, Agent, or Firm*—Thomas H. Murray; Clifford A. Poff

[57] ABSTRACT

A rack is provided for either temporary or permanent storage of spent nuclear fuel assemblies. The rack consists of a checkerboard array of substantially square cells. Alternate cells in each row include neutron-absorbing poison material, either in the cell wall or otherwise, while the other cells are storage cells for the fuel assemblies. For temporary storage, the poison cells also contain a moderator which may be water or which may be a solid hydrogen compound. For permanent storage fuel assemblies that have decayed to a lower level of radioactivity, the moderator is eliminated so that all the cells can contain spent fuel assemblies, and the entire rack structure is encased in concrete for shielding.

3 Claims, 6 Drawing Figures

STORAGE RACK FOR NUCLEAR FUEL ASSEMBLIES

BACKGROUND OF THE INVENTION

The present invention relates to storage racks for spent nuclear fuel assemblies, and more particularly to an improved rack structure usable for either temporary or permanent storage of spent fuel.

Nuclear reactors consist of an array of fuel rods containing the nuclear fuel. The fuel rods are metal tubes, typically from 8 to 15 feet in length and about ½ inch in diameter, and are supported in groups in fuel assemblies which may comprise a considerable number of rods. The large reactors utilized for power generation contain a large number of these fuel assemblies arranged in a suitable configuration.

After an extended period of operation, the irradiated or spent fuel assemblies must be removed from the reactor and replaced. The spent fuel rods contain residual amounts of the original fuel material, and varying amounts of numerous fission products resulting from fission of the nuclei of the original fuel and other nuclear reactions, as well as from radioactive decay of initially formed fission products. Certain of these materials are themselves fissionable. Many of the fission products are highly radioactive, at least initially, and thus produce considerable heat, while the entire fuel assembly is dangerously radioactive. The fuel rods can be reprocessed by chemically separating the fissionable material for reuse as fuel and recovering various other fission products, such as certain rare earth elements, for example, which have substantial commercial value.

Suitable facilities must be provided for the storage of these highly radioactive assemblies after removal from the reactor until they can be reprocessed, or if they are not to be reprocessed, then permanent storage must be provided which will insure safe disposition of these fuel assemblies for an indefinite period of time. Such storage, either temporary or permanent, presents serious problems since the fuel assemblies are initially highly radioactive and generate a great deal of heat. They must, therefore, be kept submerged in water which serves as a coolant to prevent overheating as well as a radiation shield and moderator for the fast neutrons which are still being emitted. It is also necessary to be sure that the assemblies are stored in a manner that will prevent criticality. After some period of time, the heat generation within the fuel assemblies declines, since many of the initial fission products have relatively short half-lives, and the nature of the storage problem changes as less heat is generated and the radiation hazard decreases.

SUMMARY OF THE INVENTION

In our prior U.S. Pat. No. 4,010,375, there is disclosed a storage rack for spent nuclear fuel assemblies which is intended for temporary storage of the fuel assemblies in a water-filled pit, and which maximizes the number of assemblies that may safely be stored in this way.

In accordance with the present invention, a storage rack is provided which is generally similar to that of the prior patent but which is of improved design and is suitable for use for either temporary or permanent storage of spent nuclear fuel. The new rack is of modular construction and consists of a plurality of storage cells or boxes of square cross section, all of which are of the same size and suitable to contain at least one nuclear fuel assembly. These square cells are arranged in alignment with each other in rows to form a checkerboard array and alternate cells in each row contain a poison, that is, a neutron-absorbing material. The poison cells in adjacent rows are staggered with respect to each other, and the intervening cells are utilized for storage of the fuel assemblies.

For initial or temporary storage, the poison cells contain a moderator for slowing the fast neutrons emitted from the fuel assemblies. The moderator may be water, as shown in the prior patent, which also serves as a coolant, or a solid moderator may be used in the form of blocks of a solid hydrogen-containing compound such as silicone rubber. In either case, the moderator slows down the fast neutrons so that they can be captured by the poison material in the cell, and the poison cells thus serve as neutron traps in the same manner as the poison boxes of the prior patent. The neutron-absorbing material may be provided in the cell in any suitable manner, but the poison cells are preferably made of stainless steel which is a neutron-absorbing material and thus serves both as a structural material and as a poison material. Other suitable materials could, of course, be used for the poison cells or the poison could be incorporated in the wall of the cell in any other suitable manner. When a solid moderator is used, the poison may be a material such as boron incorporated in the moderator material itself.

For permanent storage, the same rack structure may be used for storing nuclear fuel assemblies when a sufficient time has elapsed after removal of the assemblies from a reactor for radioactive decay of the fission products to result in greatly reduced generation of heat, so that water is no longer needed as a coolant, and in relatively few fast or highly energetic neutrons still being emitted. When this stage is reached, the same or a similar rack can be used in a suitable location for permanent storage of the fuel assemblies by removing the moderator from the poison cells. These cells can then be used to contain additional fuel assemblies thus, in effect, doubling the capacity of the rack. The entire rack is built or placed on a concrete base or slab and the outer row or rows of cells around the outer periphery of the rack are filled with concrete. The rack is then covered with a concrete slab or lid, thus enclosing the complete rack and its contents in a concrete vault or shield which is effective to contain any radioactive emissions for an indefinite or extremely long period of time if the rack is located in an area where it will be undisturbed.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
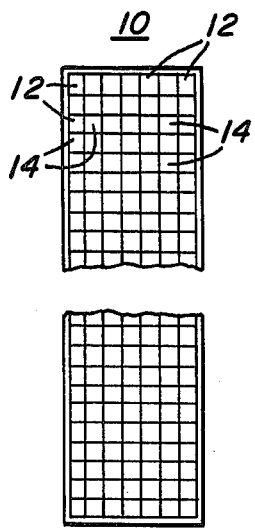
FIG. 1 is a plan view of a rack embodying the invention.
Figure 2:
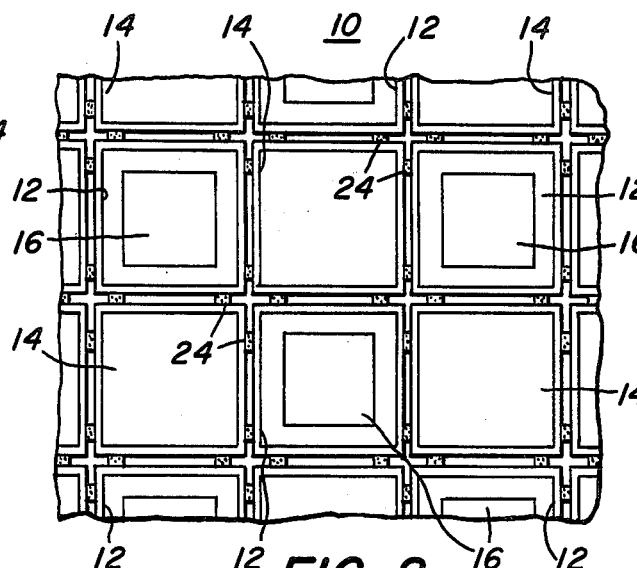
FIG. 2 is a plan view of a portion of the rack of FIG. 1 on an enlarged scale.

FIGS. 1 and 2 of the drawings show an illustrative embodiment of the invention in a storage rack for spent nuclear fuel assemblies. The rack 10 is shown alone but it will be understood that it may be immersed in a pit filled with water as described in the above-mentioned patent, or it may be located aboveground or in any suitable location as described hereinafter. The rack 10 is of modular construction and, as more clearly shown in FIGS. 2 and 3, consists of a plurality of cells 12 and 14 which are of square cross section and all of the same size and configuration. The cells 12 may be made of sheet steel or other suitable material, and alternate in each row with cells 14 which include a poison, that is, a neutron-absorbing material. This is preferably accomplished by making the cells 14 of stainless steel, which is a poison material, although the necessary poison material could be provided in other ways, if desired, as more fully discussed below.

Figure 3:
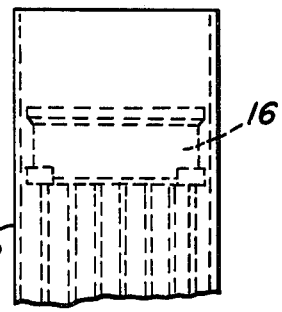
FIG. 3 is a side elevational view of one storage cell.
Figure 3:
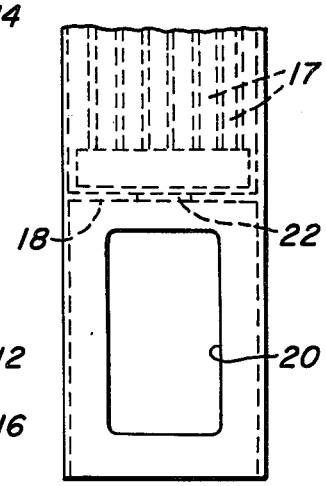

The cells 12 and 14 are arranged in rows as shown in FIGS. 1 and 2 with the cells in each row in alignment to form a checkerboard array, and with the poison cells 14 alternating with the storage cells 12 in each row, the poison cells in adjacent rows being in staggered positions with respect to each other. As shown in FIG. 3, each of the cells 12 and 14 is of suitable vertical length to contain a nuclear fuel assembly, generally indicated at 16, including a number of individual fuel rods 17. The cells 12 could, of course, be made of suitable size to contain two or more fuel assemblies, depending on the size and characteristics of the particular fuel assemblies to be stored. The cells 12 and 14 are open square cells, as shown, and a partition 18 is placed in each cell near the bottom to support a fuel assembly therein. Windows 20 are provided near the bottom of each cell and an opening 22 is provided in the partition 18 so that water can circulate freely through the cell. The cells 12 and 14 are placed essentially in contact as can be seen in FIG. 2 and adjacent cells are connected together in the top corner regions, preferably by welding as indicated at 24. Sufficient frictional engagement is thus provided between adjacent cells to provide for friction damping of vibration energy due to earthquakes, or other severe mechanical shocks, as described in the prior patent. The cells could, of course, be connected by riveting or other suitable means but welding is preferred because of the resulting ease and speed of assembling the rack.

When the rack is to be used for temporary storage of spent fuel assemblies, a fuel assembly 16 is placed in each of the storage cells 12, while the poison cells 14 contain a suitable moderator. The moderator may be water, at least initially when the fuel assemblies have recently been removed from a reactor so that they are highly radioactive and generate a relatively large amount of heat. When water is to be used, the entire rack 10 may be immersed in a water-filled pit, as described in the prior patent, so that the water can circulate freely through the cells and thus serves as a coolant as well as a moderator. The slow neutrons emitted from the fuel assemblies are readily captured by the poison material, and the moderator serves to slow down the fast neutrons as they pass through the poison cells so that they can also be captured by the poison material after passing through the moderator. In the prior patent, the poison is described as being incorporated in the walls of the poison boxes or cells by making them of a suitable neutron-absorbing material, or by applying the poison material to the walls in other ways. This could also be done in the rack of the present invention by using the materials mentioned in the prior patent, but it is preferred to make the poison cells 14 of stainless steel which has sufficient neutron-absorbing ability to function satisfactorily as a poison material and which is also a satisfactory structural material for the cells which enables their alternative use to contain fuel assemblies for permanent storage as described below.

Figure 4:
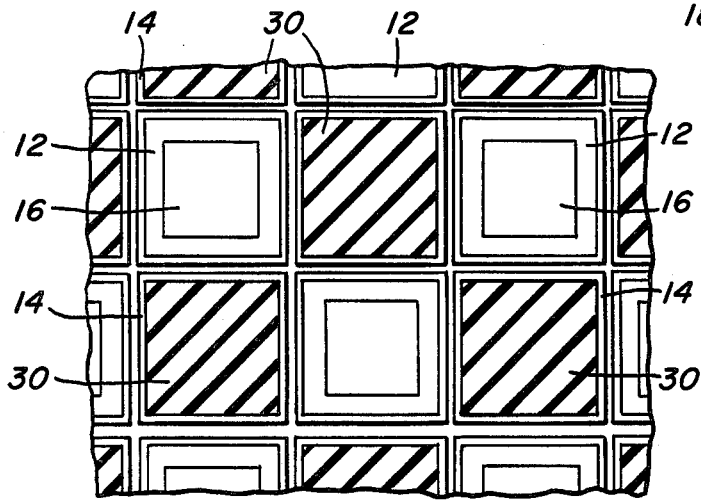
FIG. 4 is a fragmentary plan view similar to FIG. 2 but showing an alternative arrangement.

After enough radioactive decay of the fission products has occurred in the fuel assemblies, the amount of heat generated is substantially reduced and no coolant is needed. With such fuel assemblies, other moderators than water are possible and it is preferred to use a solid material, which may take the form of a solid square block 30 substantially filling each of the poison cells as shown in FIG. 4. Hydrogen is the preferred moderator for this purpose and the blocks 30, therefore, are made of a solid compound containing hydrogen. While there are, of course, many such materials, it is preferred to use silicone rubber which is relatively rich in hydrogen and is readily available at reasonable cost. Where a solid material is thus used as a moderator, the poison material is not necessarily limited to the walls of the cell but may be distributed throughout the moderator. A suitable poison material for this purpose is boron, and the preferred composition of the blocks 30 therefore is a silicone rubber incorporating about 6% by weight of boron. Other materials of equivalent neutron-absorbing ability could, of course, be utilized. When the poison material is thus incorporated in the moderator, it is unnecessary to also include a poison in the walls of the cell, and when a solid moderator of this kind is to be used, the cells 14 could be made of the same material as the cells 12, or if they are not to be used as storage cells, the cells 14 could be replaced by a light support structure for the moderator or omitted entirely.

As previously discussed, the spent fuel assemblies removed from a nuclear reactor are initially highly radioactive and generate a substantial amount of heat so that it is necessary to keep them immersed in water which functions as a coolant to carry the heat away and prevent excessive temperature rise. After some period of time, however, many of the initially present fission products of relatively short half-life have decayed sufficiently so that the amount of heat generated has decreased and the use of water as a coolant is no longer necessary. The fuel elements can then be stored in a rack 10 located aboveground, or at any convenient location, and not filled with water but containing solid moderator material in the poison cells 14 as described above and shown in FIG. 4. That is, after the initial period of storage, the fuel assemblies can be transferred to another rack for dry storage, or the same rack could be drained of water and used for continued storage in the same or another location with a solid moderator replacing the water. The spent fuel can be stored in this manner for a considerable period of time if necessary to allow further decay of the radioactive fission products or to await chemical reprocessing.

Figure 5:
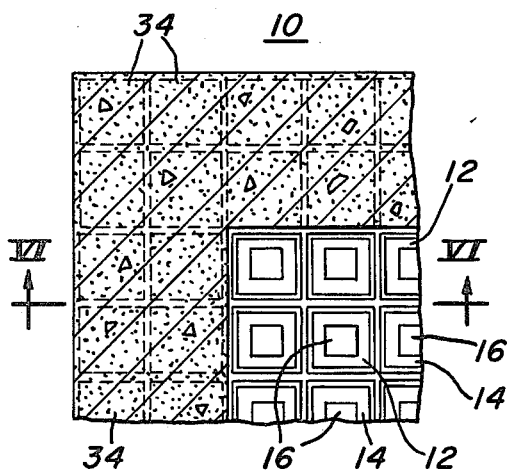
FIG. 5 is a fragmentary plan view of one corner of a storage rack similar to that of FIG. 1 as used for permanent storage.

After sufficient decay has thus occurred, and if the fuel is not to be reprocessed, the fuel assemblies can then be stored permanently in the same or a similar rack. Since permanent stroage is for an indefinite, and possibly extremely long, period of time, it must be in a remote location where the storage installation will not be disturbed and can be sufficiently isolated. A different rack will usually be required although the same rack used for temporary storage could be utilized in some cases for permanent storage. In most cases, however, the rack 10 for permanent storage would be built or assembled in its permanent location and because of the modular construction, the rack can be made of any necessary or desired size. The adjacent cells are connected by welding, as previously described, and may be fabricated in subassemblies of suitable size for shipment and subsequent joining together in the field to make a complete rack of whatever size or extent is required. As previously explained, after sufficient radioactive decay has occurred for permanent storage, a moderator is not needed. The poison cells 14 can, therefore, be used as additional storage cells and a fuel assembly 16 is placed in each of these cells as shown in FIG. 5. The poison material of the cell walls is still utilized for absorbing the neutrons that are still being emitted, but most of the neutron flux at this point consists of relatively slow neutrons which are readily captured, and the amount of heat generated is small enough that no particular coolant is required. The rack can thus be completely filled with fuel assemblies for maximum capacity.

Figure 6:
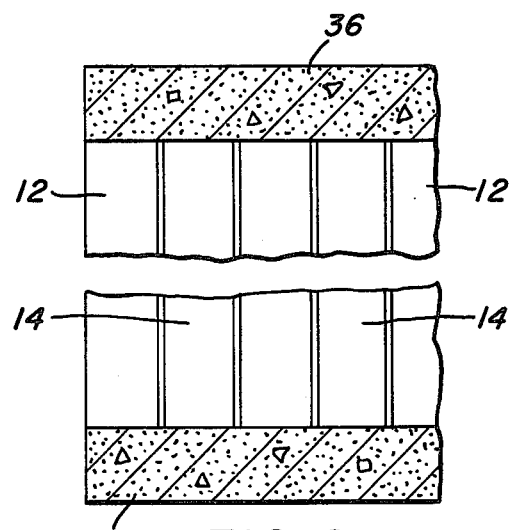
FIG. 6 is a vertical sectional view taken on line VI—VI of FIG. 5.

As shown in FIGS. 5 and 6, heavy permanent shielding is also provided for containing and absorbing the radiation. For this purpose, the permanent storage rack 10 is built or assembled on a concrete base or slab 32 of suitable thickness and coextensive in size with the rack itself. After the rack is completely assembled, it is filled with the fuel assemblies 16 to be stored which are placed in all the cells 12 and 14 except the outer row or rows of cells around the entire outer periphery of the rack. These outer cells are then filled with concrete as indicated at 34 in FIG. 5. The top of the rack is covered with a concrete slab or lid 36 covering the entire rack and of the same thickness as the base 32. The joints between the slabs 32 and 36 and the concrete 34 may be sealed in any desired or suitable manner, and the rack and its contents are thus completely encased in a concrete vault. A solid, strong and highly durable structure is thus provided completely enclosing and containing the radioactive fuel assemblies with complete safety. Such a structure is capable of surviving for a very long period of time if left undisturbed and provides effective and safe storage of spent nuclear fuel.

We claim as our invention:

1. A storage rack for spent nuclear fuel assemblies comprising a plurality of abutting substantially square cells each of substantially the same cross-sectional area and each adapted to contain at least one fuel assembly, said cells being disposed in alignment with each other in a checkerboard array with adjacent cells connected together to form a modular rack, at least selected ones of said cells including neutron-absorbing material, solid radiation-shielding material completely encasing the rack, said shielding material comprising concrete filling at least one outer row of cells on all sides of the rack, and concrete slabs covering the entire top and bottom surfaces of the rack.

2. A storage rack as defined in claim 1 in which said selected ones of said cells comprise alternate cells in staggered positions in each row of cells.

3. A storage rack as defined in claim 1 in which said selected ones of said cells are made of stainless steel.

* * * * *